United States Patent
Wu

(10) Patent No.: US 6,526,746 B1
(45) Date of Patent: Mar. 4, 2003

(54) ON-BOARD REDUCTANT DELIVERY ASSEMBLY

(75) Inventor: Ching-Hsong George Wu, Farmington Hills, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/631,090

(22) Filed: Aug. 2, 2000

(51) Int. Cl.$^7$ ................................................ F01N 3/00
(52) U.S. Cl. ...................... 60/286; 239/585.1
(58) Field of Search ............................ 60/286; 239/407, 239/408, 585.1, 128, 129, 130, 131, 132.3, 132.5

(56) References Cited

U.S. PATENT DOCUMENTS

| | | | | |
|---|---|---|---|---|
| 3,656,693 A | * | 4/1972 | Eckert .......................... | 239/410 |
| 3,906,725 A | | 9/1975 | Addoms et al. | |
| 4,075,982 A | * | 2/1978 | Asano et al. .................. | 60/276 |
| 4,139,157 A | | 2/1979 | Simmons | |
| 4,185,779 A | * | 1/1980 | Watson ..................... | 239/533.3 |
| 4,271,675 A | | 6/1981 | Jones et al. | |
| 4,324,208 A | * | 4/1982 | Danckert et al. ........... | 181/204 |
| 4,496,292 A | * | 1/1985 | Panick et al. ............... | 417/252 |
| 4,644,878 A | | 2/1987 | Nodd et al. | |
| 4,693,224 A | * | 9/1987 | McKay ........................ | 123/531 |
| 4,825,828 A | * | 5/1989 | Schlunke et al. ........... | 239/453 |
| 4,836,453 A | * | 6/1989 | Poehlman .................... | 239/585 |
| 4,848,658 A | * | 7/1989 | Aketa et al. ................... | 239/88 |
| 4,917,307 A | * | 4/1990 | Baxter et al. ................ | 239/585 |
| 4,978,074 A | * | 12/1990 | Weinand ...................... | 239/585 |
| 5,035,360 A | * | 7/1991 | Green et al. ................. | 239/585 |
| 5,046,472 A | * | 9/1991 | Linder ......................... | 239/585 |
| 5,056,488 A | * | 10/1991 | Eckert ......................... | 123/446 |
| 5,218,824 A | | 6/1993 | Cederwall et al. | |
| RE34,945 E | * | 5/1995 | Sayer et al. .............. | 239/585.1 |
| 5,540,047 A | * | 7/1996 | Dahlheim et al. ............ | 60/286 |
| 5,605,042 A | * | 2/1997 | Stutzenberger .............. | 60/286 |
| 5,613,363 A | | 3/1997 | Joshi et al. | |
| 5,622,155 A | * | 4/1997 | Ellwood et al. ............. | 123/531 |
| 5,634,597 A | * | 6/1997 | Krohn et al. ............. | 239/585.5 |
| 5,884,475 A | * | 3/1999 | Hofmann et al. ............. | 60/301 |
| 6,050,088 A | * | 4/2000 | Brenner ........................ | 60/286 |
| 6,073,862 A | * | 6/2000 | Touchette et al. ........... | 239/408 |
| 6,161,527 A | * | 12/2000 | Ruman ........................ | 239/408 |
| 6,167,698 B1 | * | 1/2001 | King et al. .................... | 60/286 |
| 6,192,677 B1 | * | 2/2001 | Tost ............................. | 60/286 |
| 6,200,535 B1 | * | 3/2001 | Hartweg et al. ............ | 422/172 |
| 6,311,484 B1 | * | 11/2001 | Roth et al. ..................... | 60/286 |

* cited by examiner

Primary Examiner—Thomas Denion
Assistant Examiner—Diem T Tran
(74) Attorney, Agent, or Firm—Dykema Gossett PLLC; Carlos L. Hanze

(57) ABSTRACT

An on-board reductant delivery assembly 407 for an exhaust line of an internal combustion engine powered motor vehicle is provided. In a preferred embodiment the system includes a nozzle 410 for atomizing delivery of reductant into the exhaust line. A transfer tube 418 is connected with the nozzle 410 for delivering the reductant. A housing 422 having an outlet is connected with the transfer tube 418 opposite the nozzle 410. The housing 422 has a front end forming a mixing chamber 496 and a main body with inlets 426, 456 for pressurized air and reductant. An electrically powered fluid metering pump 476 having exposed coils 508 is cooled by air which is delivered to said housing 422 through the pressurized air inlet 456. The fluid metering device 476 has an inlet connected with the housing reductant inlet.

18 Claims, 4 Drawing Sheets

ON-BOARD REDUCTANT DELIVERY ASSEMBLY

FIELD OF THE INVENTION

The present invention relates generally to exhaust systems for motor vehicles and, more specifically, to an on-board reductant delivery assembly for an exhaust aftertreatment system of a motor vehicle.

BACKGROUND OF THE INVENTION

Exhaust aftertreatment systems for motor vehicles are known. Typically, the exhaust aftertreatment system includes an exhaust manifold connected to the engine of a motor vehicle and a close-coupled catalyst connected via an exhaust pipe to the exhaust manifold. The exhaust system also includes an underbody catalyst connected via the exhaust pipe to the close-coupled catalyst and a tail pipe connected to the underbody catalyst.

Lean NOx catalysts (LNC) and selective catalytic reduction catalysts (SCR) are known to reduce NOx emissions from diesel and lean-burn gasoline engines. In order to promote NOx reduction under oxidizing environments, certain reductants such as hydrocarbon (HC) fuels and/or urea solution or other ammonia (NH3) containing compounds must be added. To function effectively, the conditions for adding these reducing compounds to the exhaust aftertreatment system are critical. Specifically, the injected quantity must precisely match the NOx concentration in order to obtain maximum conversion and to avoid HC and/or NH3 slippage.

The amount of added catalyst also depends upon factors such as the exhaust flow rate and catalyst temperature. Therefore, a fluid metering device is needed to regulate the reductant flow. In addition, the reductant must be dispersed and mixed well with the exhaust gas to obtain optimal results of NOx reduction. The above factors require that the reductant be well atomized of vaporized before reaching the catalyst.

Prior to the present invention, one method of reductant delivery was to have a fluid metering device 9 (FIGS. 1 and 2), such as an electronic fuel injector or a metering pump to deliver a controlled quality reductant. The fluid metering device 9 has a suction line 11 connected with a reservoir 15 of reductant. The fluid metering device 9 introduces the reductant into a mixing chamber 19 provided by an enclosure or tubular fixture 23. An air compressor 25 is a source of pressurized air. A line 27 is connected between the air compressor 25 and fixture 23 to allow pressurized air to be delivered to the mixing chamber 19. The air/reductant mixture is then directed through a transfer tube 31 to a nozzle 35. The air/reductant mixture is then sprayed into the exhaust line 37 of the vehicle. Due to the high pressure differential and the orifice structure of the nozzle 35, the air reductant mixture coming out of the nozzle 35 is quickly converted into very fine droplets which quickly vaporize and mix with the exhaust gas prior to the downstream emission catalysts.

Prior to the present invention, the fluid metering device 9 and the tubular fixture 23 of the mixing chamber 19 were two separate components. The metering device 9 and the tubular fixture 23 had to be assembled closely connected in a way that the reductant could be delivered to the mixing chamber 19 without leakage or separation. The assembly of the fluid metering device 9 into the tubular fixture 23 not only required on line final assembly production time but also required additional parts such as O-rings, tubing, connectors and brackets to hold the fluid metering device 9 and tubular fixture 23 to prevent separation.

It is desirable to provide a reductant delivery assembly which couples the fluid metering device with an enclosure, which has a control volume wherein air can mix with the reductant. Placing the fluid metering device within an enclosure would lower the potential for leakage and eliminate the extra parts, time and labor required for production line assembly of two separate components. It is also desirable to provide a reductant delivery assembly wherein the weight and volume of the reductant delivery system is reduced. It is additionally desirable to provide a reductant delivery assembly which can reduce costs. It is also desirable to provide a reductant delivery assembly with an improved response time. It is also desirable to provide a reductant delivery assembly wherein the fluid delivery system is protected from overheating and wherein there is improved reductant vaporization. It is furthermore desirable to provide a reductant delivery assembly wherein the reductant is heated during the initial stages of vehicle operation after the vehicle has been stored in cold inclement weather.

SUMMARY OF THE INVENTION

To make manifest the above noted desires, the revelation of the present invention is brought forth. In one preferred embodiment of the present invention, an on-board reductant delivery assembly is provided which includes a nozzle for atomizing delivery of a reductant into the exhaust line of the vehicle. A transfer tube is connected with the nozzle for delivering the reductant. A housing having an outlet fluidly connected with the transfer tube opposite the nozzle is provided. The housing has a front end forming a mixing chamber. A rear end of the housing has first and second chambers. The first and second chambers of the housing are fluidly connected by a plurality of inlets. The inlets between the first and second chambers of the housing have fins or buffers to induce turbulent airflow within the second chamber. A pressurized air inlet is connected with the first chamber of the housing. A fluid metering device is positioned within the housing. The fluid metering device delivers a measured portion of reductant into the mixing chamber of the housing as required. The fluid metering device is electrically powered and has coils which are positioned within the second chamber of the housing. The coils have an exposed outer boundary and are cooled by the turbulent airflow which passes through the second chamber of the housing. The metering device has an outlet which is fluidly connected with the mixing chamber and a venturi throat.

It is an object of the present invention to provide an on-board reductant delivery assembly wherein the metering device is positioned within a housing which also forms an enclosure providing a mixing chamber for pressurized air and the reductant.

The above-noted object and other advantages of the present invention will become more apparent to those skilled in the art as the invention is further explained in the accompanying drawings and detailed description.

DETAILED DESCRIPTION OF THE INVENTION

Figure 1:
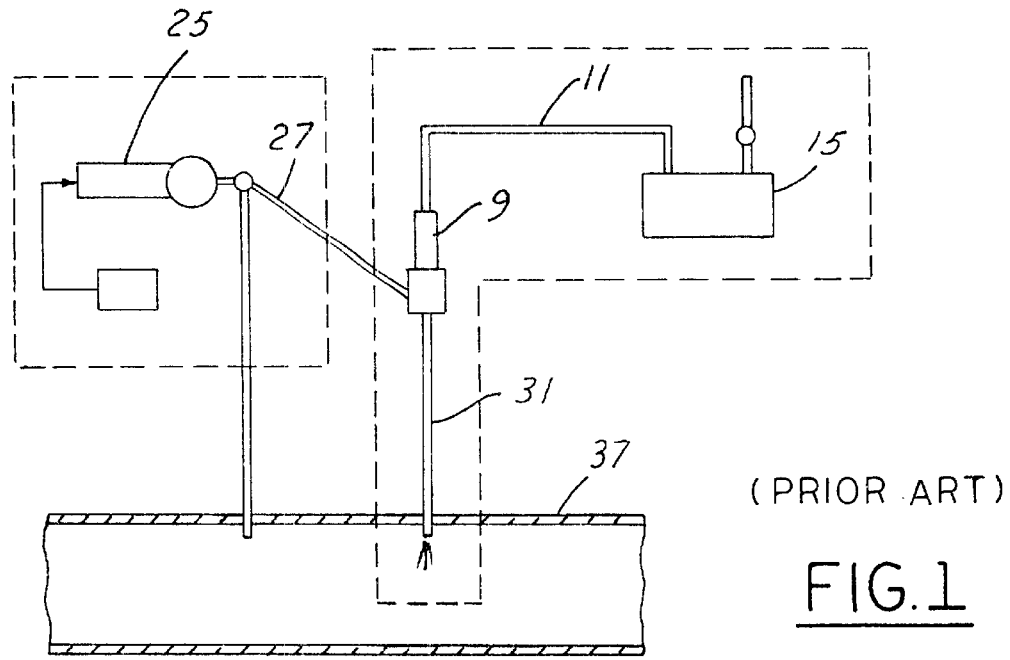
FIG. 1 is a schematic view of an on-board reductant delivery system prior to the present invention.
Figure 2:
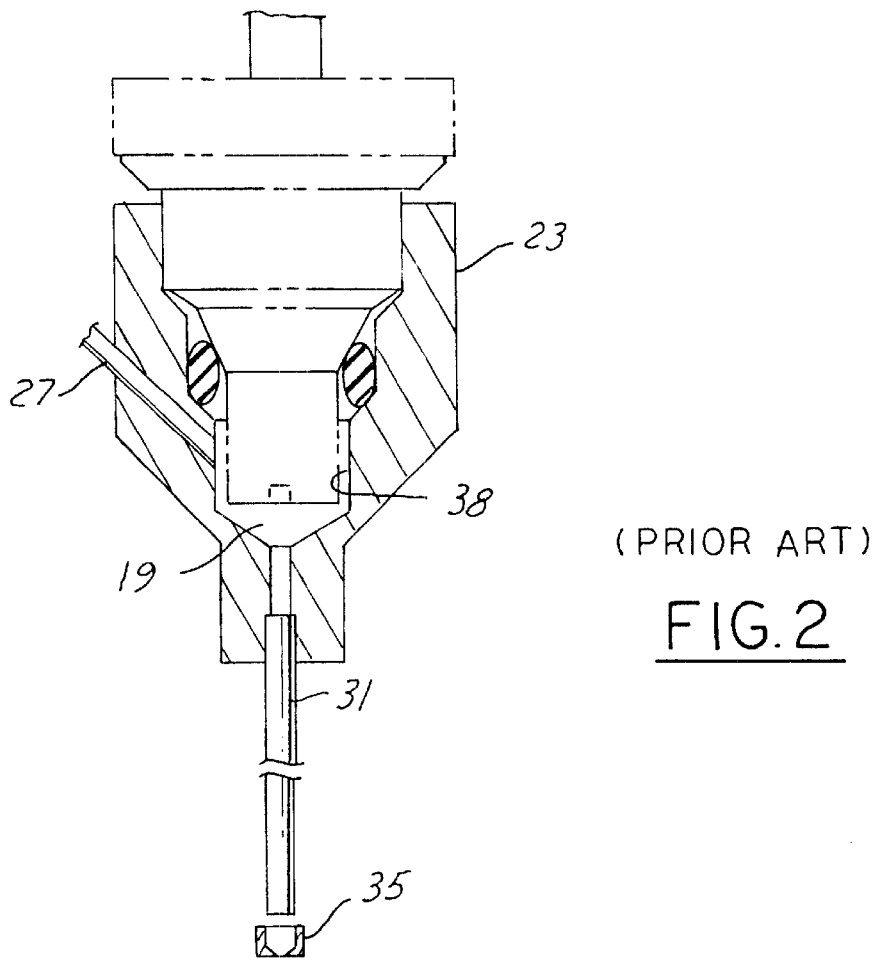
FIG. 2 is an enlarged view of a portion of the on-board reductant delivery system shown in FIG. 1.
Figure 3:
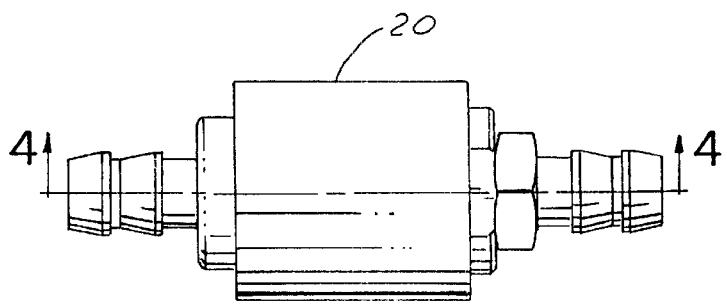
FIG. 3 is a side elevational view of a metering pump used as a metering device in an embodiment of the present invention.
Figure 4:
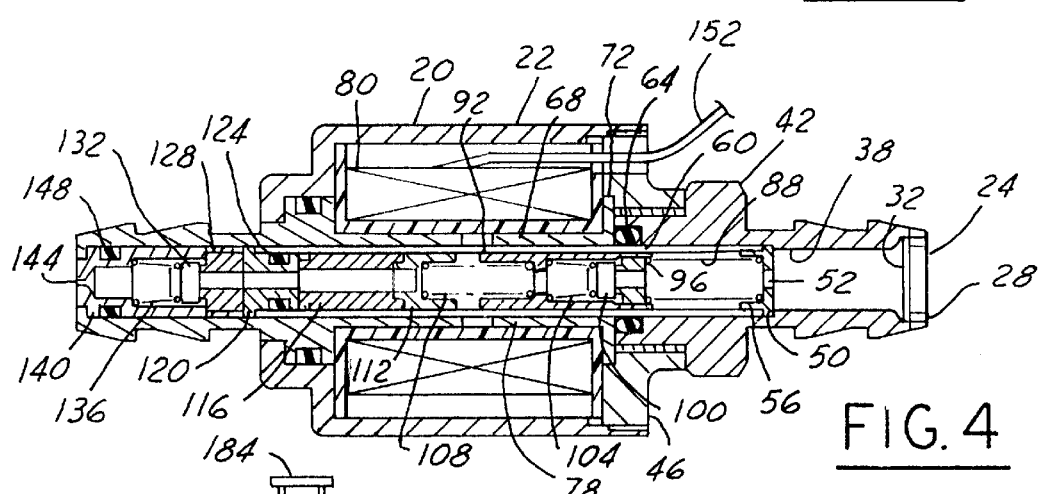
FIG. 4 is a sectional view taken along lines 4—4 of FIG. 3.
Figure 5:
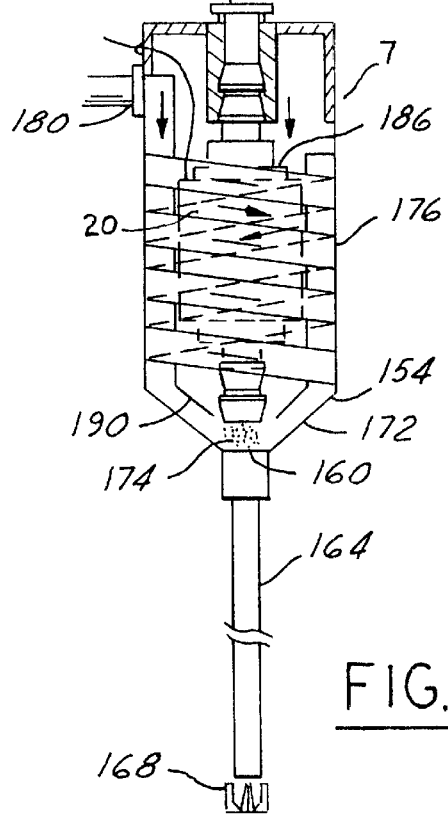
FIG. 5 is a partially sectioned side elevational view of an on-board fluid delivery assembly according to the present invention.

Referring to FIGS. 3–5, an embodiment of the fluid metering assembly 7 of the present invention has an electrically powered metering pump 20. The pump 20 has at a rear end an inlet 24 that is fluidly connected with the reductant inlet of a housing (to be described). The pump 20 has at inlet 24 a filter retainer 28. The filter retainer 28 holds in position a filter 32. The filter 32 is fitted against a shoulder provided in the central bore 38 of a suction joint 42. The suction joint 42 is threadably received into a central aperture provided in coil retainer 46. Mounted adjacent a shoulder within the central bore 38 of the suction joint 42 is a cylinder cap 50. The cylinder cap 50 has a central or fixed opening 52. The cylinder cap 50 has a cylindrical extension 56 which is received within an extreme end of an elongated brass cylinder 60. The cylinder 60 at its rearward end is peripherally sealed by an O-ring 64. Abutting the O-ring 64 is a lower magnetic pole 68. The lower magnetic pole 68 has a flange 72 which abuts the O-ring 64. Connected with the flange 72 of the magnetic pole 68 is a cylindrical portion 78. Encircling the magnetic pole cylindrical portion 78 is a solenoid coil 80. A forward end of the solenoid coil 80 is supported upon a delivery joint 84.

Mounted by the cylinder cap 50 is a stainless steel coil spring 88. The coil spring 88 biases in a forward direction a plunger 92. The plunger 92 at its rear end has a valve seat 96 having a central bore extending therethrough. Slidably mounted within the valve seat 96 is a stem of a suction one-way or check valve 100. The suction valve 100 is spring biased rearwardly by a suction valve spring 104. The suction valve spring 104 at its forward end abuts an internal shoulder provided within the plunger 92. The plunger 92 receives a spring 108 which is captured between the plunger 92 and a stopper 112. The stopper 112 abuts a retainer 120. The retainer along an outer peripheral surface has an O-ring 124 which seals against the cylinder 60. The retainer along its forward end abuts against a valve seat 128. The valve seat 128 slidably mounts a stem of a delivery valve 132. The delivery valve 132 is biased to a rearward position by a spring 136. An orifice member 140 has an outlet 144 and is sealed along its peripheral edge by an O-ring 148. A lead line 152 is connected with the solenoid coil 80.

On operation of the pump 20, the solenoid coil 80 receives a current through the lead line 152. The current generates a magnetic field in the lower magnetic pole 68. The magnetic field causes the plunger 92 to be urged forward against the biasing of the spring 88. The reductant is pushed forward. Suction is created behind the plunger 92. The forward motion of the plunger 92 causes the reductant fluid within the plunger 92 to urge the suction valve 100 to a closed position. The reductant fluid is then pushed through the central bores in the stopper 112, spacer 116 and the retainer 120. The pressurized reductant fluid then lifts the delivery valve 132 off its valve seat 128 and is then pushed out of the outlet 144 and the orifice 140. The current is cut off. The spring 108 returns the plunger 92 to its rest or steady state position. The reductant fluid between the plunger 92 and the cylindrical cap 50 pushes against the stem of the suction valve 100 causing it to be lifted off its seat 96. The suction valve 100 can easily be lifted off of the seat 96 due to the low force of the valve spring 104. Reductant fluid then moves forward of the suction valve 100. The suction valve 100 resets. The next cycle begins. The pump 20 provides two functions, that of a pump and a specific metering device which can incrementally control the amount of reductant which is displaced through the outlet 144.

The current going through lead line 152 can be pulse width modulated or frequency modulated to precisely control the amount of reductant which is pushed out and typically can provide the reductant at pressures up to 30 psi.

Referring to FIG. 5, the reductant delivery assembly according to the present invention has sealed control volume provided by a housing 154. The housing 154 has an outlet 160 which is fluidly connected with at least one transfer tube 164. The transfer tube 164 at its extreme end is connected with a nozzle 168 which atomizes an air reductant mixture into an exhaust system of a combustion engine powered vehicle. The housing 154 has a front end 172. The housing front end 172 forms a mixing chamber 174. The housing 154 also has a main body 176. The housing main body 176 has an inlet 180 to receive pressurized air from a pressurized air source (not shown). The inlet 180 is adjacent an end of the housing main body 176 generally opposite the housing outlet 66, 60. The housing main body 176 also has an inlet 184 for reductant via a line (not shown) which is connected with a reservoir of reductant. Positioned within the housing main body 176 is the aforedescribed pump 20. The housing 176 also has a series of baffles 186 and lower baffles 190. The baffles 186, 190 direct the incoming pressurized air in a turbulent manner to swirl about the outer skin housing 22 to cool the housing from the heat generated from the coils 80 or from the exhaust gas. Additionally, during very inclement weather conditions, the incoming pressurized air may actually be preheated by electrical heating or other means to warm the pump 20, which in turn, thaws the reductant to a more appropriate operating temperature during the initial stages and the remaining stages of vehicle operation. The baffles 186, 190 divert the pressurized air to turbulently encircle the pump 20 and also direct the incoming air to the optimum position and angle of approach to the mixing chamber 174. It is apparent to those skilled in the art that the housing 176 can have a plurality of pressurized air inlets 180 or function to be connected to a plurality of transfer tubes 164 as is appropriate.

Figure 6:
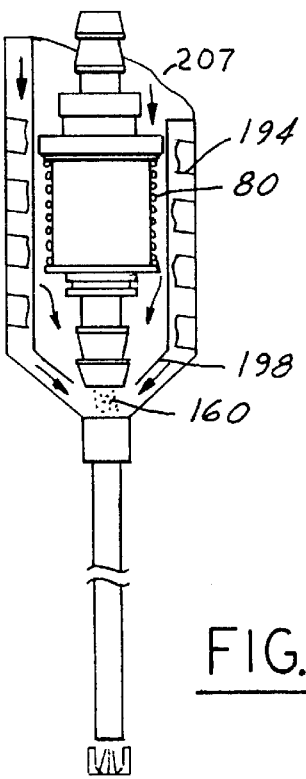
FIG. 6 is a view similar to that of FIG. 5 illustrating an alternate preferred embodiment of the present invention wherein the metering pump has exposed solenoid coils.

Referring the FIG. 6, an alternate preferred embodiment 207 of the present invention is shown wherein the pump does not have the outer skin 22. Appropriately, the baffles 194, 198 are modified since the efficiency of cooling the solenoid coils 80 and heating the reductant is increased.

Figure 7:
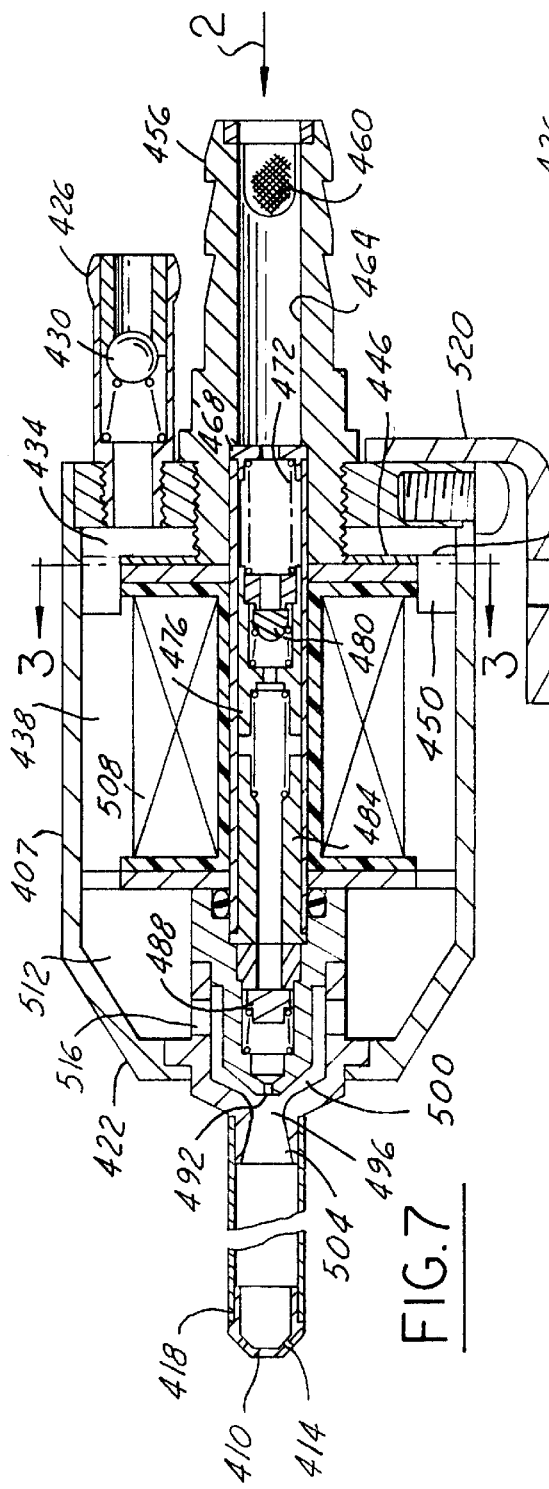
FIG. 7 is a sectional view similar to FIG. 4 illustrating an alternate preferred embodiment of the present invention having a housing with a mixing chamber having a venturi throat and also having a bracket for attachment of the metering pump and housing to a component of the automotive vehicle.
Figure 9:
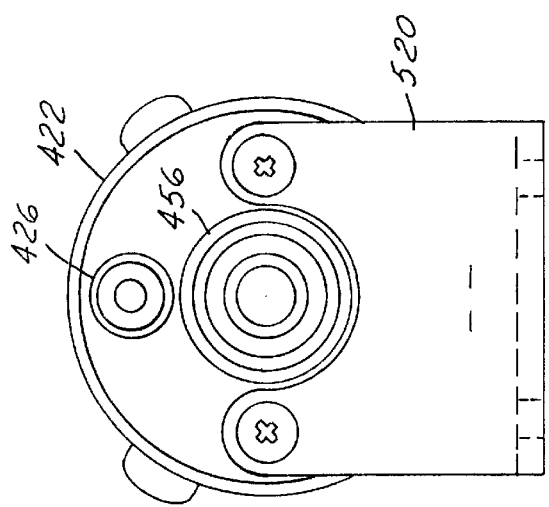
FIG. 9 is a back elevational view of the on-board reductant delivery assembly shown in FIG. 7.
Figure 8:
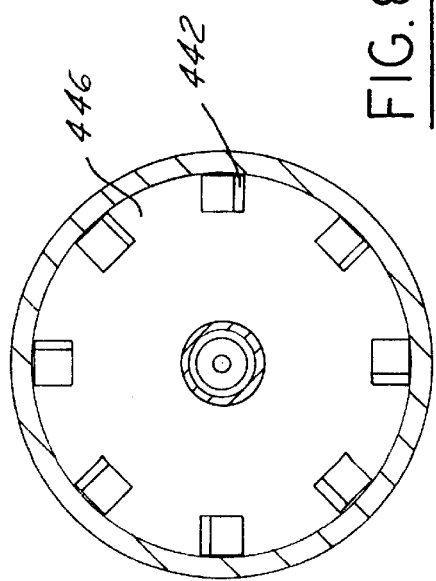
FIG. 8 is a view along lines 8—8 of FIG. 7.

Referring to FIGS. 7–9, an alternate preferred embodiment on-board reductant delivery assembly 407 is provided.

The reductant delivery assembly 407 has a nozzle 410 having a plurality of diverging outlets 414. The nozzle 410 is connected to a transfer tube 418. The transfer tube is connected with a housing 422. The housing 422 has a pressurized air inlet 426. Positioned within the pressurized air inlet is a check valve 430. The check valve 430 prevents reductant flow from an interior of the housing 422 out the pressurized air inlet 426. The air inlet 426 is fluidly connected with a first chamber 434 and is fluidly connected with a second chamber 438 of the housing by a series of geometrically spaced inlets 442. Positioned within the first chamber 434 is a diverter plate 446. The diverter plate 446 has a plurality of fins 450 which are preferably curvilinear along three axes to induce a swirling turbulent flow to the pressurized air which passes from the first chamber 434 to the second chamber 438.

The housing 422 has a reductant inlet which is generally coterminous with a reductant inlet 456. Reductant inlet 456 has an inlet screen 460. The reductant inlet 456 has a multi-diameter central bore 464 with a cylinder cap 468. The cylinder cap 468 mounts a biasing spring 472 which engages against a plunger assembly 476 having a check valve assembly 480 mounted therein. A stopper 484 and a front end check valve 488 are also provided. Beyond the front end check valve 488 is a reductant outlet 492. The reductant outlet 492 is fluidly connected with a mixing chamber 496. The mixing chamber 496 has a venturi throat formed by a converging portion 500 and a diverging portion 504. The reductant outlet 492 is positioned to be in the converging portion 500. To electrically actuate the measured pumping action of the reductant delivery assembly 407 there is provided a coil 508.

The coil 508 is controlled by pulse width modulation and frequency modulation to reciprocally move the plunger assembly 476 to pump a measured amount of reductant as previously described with regard to the metering pump 20 in FIG. 4. After cooling the coil 508, the pressurized air enters a front chamber 512. From front chamber 512 the pressurized air enters into a mixing chamber inlet 516 and thereinafter enters into the mixing chamber 496 flowing through the venturi throat 500. An L-shaped bracket 520 is provided to allow the housing 422 to be fixably connected on the exhaust pipe (not shown).

Figure 10:
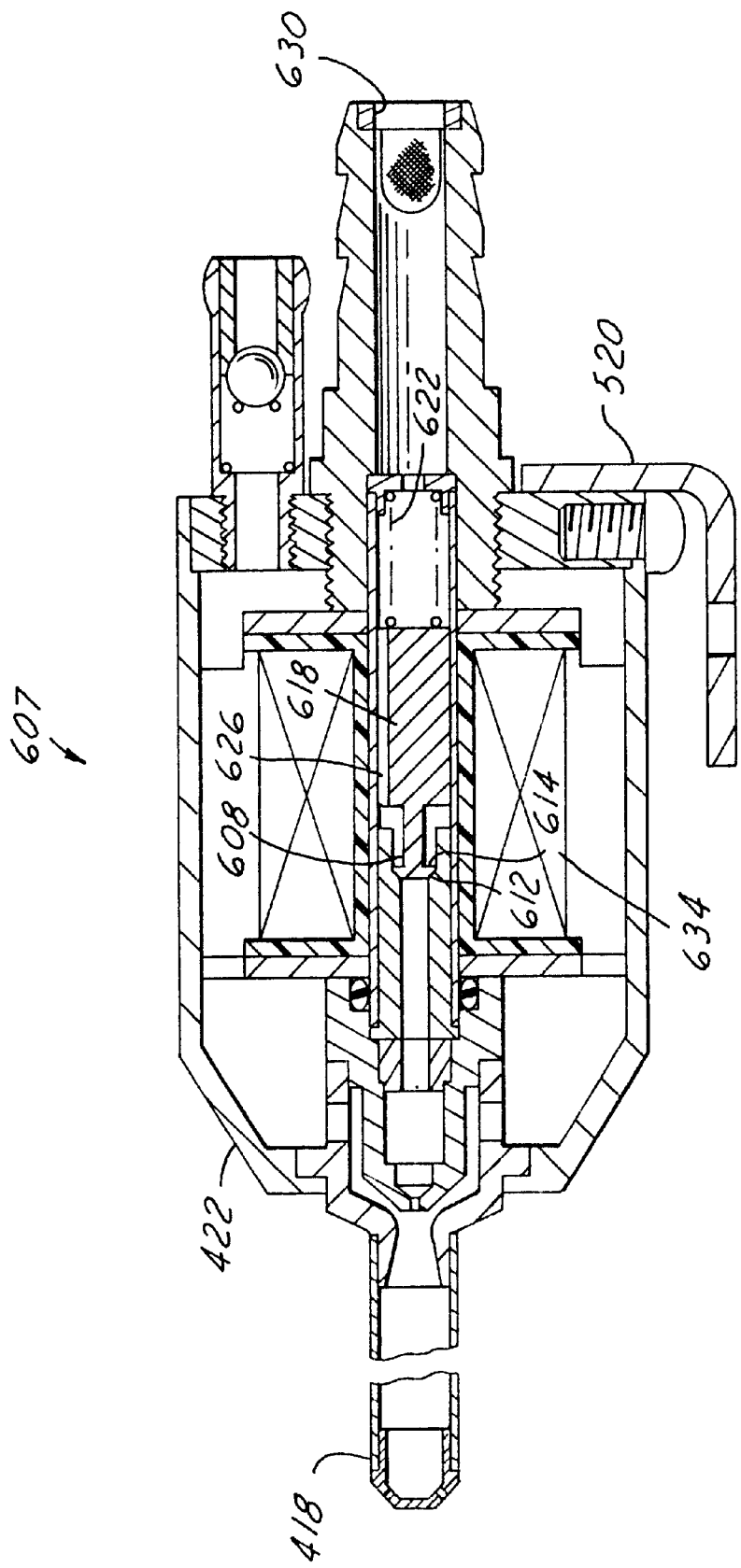
FIG. 10 is a sectional view of an on-board reductant delivery assembly similar to that in FIG. 7 having a solenoid valve as the metering device.

Referring to FIG. 10, an alternate embodiment of the present invention is shown which utilizes an electronic fuel injector or a solenoid valve 608 as a metering device. When utilizing a reductant delivery assembly 607 with a solenoid valve 608, there must be a source of pressurized reductant independent of the housing 422. The pressurizing system may be similar to that as described in U.S. patent application Ser. No. 09/375,221, filed Aug. 16, 1999, commonly assigned, the disclosure of which is incorporated herein by reference. The solenoid valve assembly 608 has a valve seat 612 which is contacted by a valve head 614. The valve head is connected to a plunger 618. The plunger is spring loaded to a closed position by a biasing spring 622. The plunger also has a longitudinal slot 626 to allow passage of the reductant through the reductant inlet 630 to the valve seat 612. Actuation of the coil 634 allows the solenoid valve assembly 608 to move the plunger 618 rearwardly (to the left, as shown in FIG. 10) to meter the flow of reductant. The remainder of the operation of the reductant delivery assembly 607 is identical to that previously described for the reductant delivery assembly 407.

While preferred embodiments of the present invention have been disclosed, it is to be understood that they have been shown by way of example only and that various modifications can be made without departing from the spirit and scope of the invention as it is encompassed in the following claims.

I claim:

1. An on-board reductant delivery assembly for an exhaust line of an internal combustion engine powered motor vehicle comprising:

a nozzle for atomizing delivery of said reductant into said exhaust line;

a transfer tube connected with said nozzle for delivering said reductant;

a housing having an outlet fluidly connected with said transfer tube opposite said nozzle, said housing having a front end forming a mixing chamber and a main body with an inlet for pressurized air and an inlet for reductant; and an electrically powered metering pump positioned within a sealed control volume of said housing for delivering reductant to said mixing chamber, said metering pump having an outlet connected with said housing mixing chamber, said metering pump being cooled or warmed by pressurized air delivered into said pressurized air inlet and turbulently encircling said metering pump, and said metering pump having an inlet connected with said housing reductant inlet.

2. An on-board reductant delivery assembly as described in claim 1, wherein said metering pump has coils which have an exposed outer boundary.

3. An on-board reductant delivery assembly as described in claim 1, wherein said metering pump has coils covered by an outer skin.

4. An on-board reductant delivery assembly as described in claim 1, wherein said metering device is controlled with pulse width modulation.

5. An on-board reductant delivery assembly as described in claim 1, wherein said metering device is a solenoid operated valve.

6. An on-board reductant delivery assembly for an exhaust line of an internal combustion engine powered motor vehicle comprising:

a nozzle for atomizing delivery of said reductant into said exhaust line;

a transfer tube connected with said nozzle for delivering said reductant;

a housing having an outlet fluidly connected with said transfer tube opposite said nozzle, said housing having a front end forming a mixing chamber and a main body with an inlet for pressurized air and an inlet for reductant; and an electrically powered fluid metering pump having coils with an exposed outer boundary which is cooled by turbulent air which encircles said pump which is delivered to said housing through said housing pressurized air inlet, and said fluid metering device having an inlet connected with said housing reductant inlet.

7. An on-board reductant delivery assembly as described in claim 6, wherein said housing has a first chamber and a second chamber wherein said first chamber is fluidly connected with said pressurized air inlet and said second chamber has said coils of said metering pump positioned therein and wherein there are a plurality of inlets from said first chamber to said second chamber.

8. An on-board reductant delivery assembly as described in claim 7, wherein said inlets between said first and second chambers of said housing have fins which divert said pressurized air to turbulently pass therethrough.

9. An on-board reductant delivery assembly as described in claim 6, wherein said mixing chamber includes a venturi throat.

10. An on-board reductant delivery assembly as described in claim 9, wherein said reductant is delivered into said mixing chamber along a converging portion of said venturi throat of said mixing chamber.

11. An on-board reductant delivery assembly as described in claim 6, further including a bracket to allow said housing to be connected with a vehicle.

12. An on-board reductant delivery assembly as described in claim 6, further including a check valve in said pressurized air inlet to prevent any flow of air out of said pressurized air inlet.

13. An on-board reductant delivery assembly for an exhaust line of an internal combustion powered motor vehicle comprising:

a nozzle for atomizing delivery of said reductant into said exhaust line;

a transfer tool connected to said nozzle for delivering said reductant;

a housing having an outlet fluidly connected with said transfer tube opposite said nozzle, said housing having a front end following a mixing chamber and a main body with an inlet for pressurized air and an inlet for reductant, said housing also having a first chamber adjacent said pressurized air inlet and said housing having a second chamber, said first and second chambers being fluidly connected by a plurality of inlets having fins for inducing turbulent flow of air from said first chamber to said second chamber, said mixing chamber of said housing having a venturi throat at an outlet of said mixing chamber; and an electrically powered fluid metering pump positioned within said second chamber of said housing for delivering reductant to said mixing chamber, said fluid metering pump having an outlet fluidly connected with said mixing chamber along a converging portion of said venturi throat of said mixing chamber; said fluid metering pump having coils with an exposed outer boundary which are cooled by said turbulent flow of air encircling said pump within said housing second chamber.

14. An on-board reductant delivery assembly for an exhaust line of an internal combustion engine powered motor vehicle comprising:

a nozzle for atomizing delivery of said reductant into said exhaust line;

a transfer tube connected with said nozzle for delivering said reductant;

a housing having an outlet fluidly connected with said transfer tube opposite said nozzle, said housing having a front end forming a mixing chamber and a main body with an inlet for pressurized air and an inlet for reductant; and an electrically powered fluid metering pump having coils with an exposed outer boundary which is cooled by turbulent air which encircles said pump which is delivered to said housing through said housing pressurized air inlet, and said fluid metering device having an inlet connected with said housing reductant inlet, and wherein said housing has a first chamber and a second chamber wherein said first chamber is fluidly connected with said pressurized air inlet and said second chamber has said coils of said metering pump positioned therein and wherein there are a plurality of inlets from said first chamber to said second chamber.

15. An on-board reductant delivery assembly for an exhaust line of an internal combustion engine powered motor vehicle comprising:

a nozzle for atomizing delivery of said reductant into said exhaust line;

a transfer tube connected with said nozzle for delivering said reductant;

a housing having an outlet fluidly connected with said transfer tube opposite said nozzle, said housing having a front end forming a mixing chamber and a main body with an inlet for pressurized air and an inlet for reductant; and a fluid metering device with a major portion thereof positioned within a sealed control volume of said housing for delivering reductant to said mixing chamber, said fluid metering device having an outlet connected with said housing mixing chamber, said fluid metering device being cooled or warmed by pressurized air delivered into said pressurized air inlet which encircles a major portion of said fluid metering device within said housing, and said fluid metering device having an inlet connected with said housing reductant inlet.

16. An on-board reductant delivery assembly for an exhaust line of an internal combustion engine powered motor vehicle comprising:

a nozzle for atomizing delivery of said reductant into said exhaust line;

a transfer tube connected with said nozzle for delivering said reductant;

a housing having an outlet fluidly connected with said transfer tube opposite said nozzle, said housing having a front end forming a mixing chamber and a main body with an inlet for pressurized air and an inlet for reductant; and a fluid metering device positioned within a sealed control volume of said housing for delivering reductant to said mixing chamber, said fluid metering device being supported generally adjacent to a front end and a rear end within said housing, said fluid metering device having an outlet connected with said housing mixing chamber, said fluid metering device being cooled or warmed by pressurized air delivered into said pressurized air inlet flowing between said fluid metering device and said housing between front and rear supported ends of said fluid metering device, and said fluid metering device having an inlet connected with said housing reductant inlet.

17. An on-board reductant delivery assembly for an exhaust line of an internal combustion engine powered motor vehicle comprising:

a nozzle for atomizing delivery of said reductant into said exhaust line;

a transfer tube connected with said nozzle for delivering said reductant;

a housing having an outlet fluidly connected with said transfer tube opposite said nozzle, said housing having a front end forming a mixing chamber and a main body with an inlet for pressurized air and an inlet for reductant;

an electrically powered fluid metering pump having coils with an exposed outer boundary which is cooled by turbulent air which encircles said pump which is delivered to said housing through said housing pressurized air inlet, and said fluid metering device having an inlet connected with said housing reductant inlet; and wherein said housing has a first chamber and a second chamber wherein said first chamber is fluidly connected with said pressurized air inlet and said second chamber has said coils of said metering pump positioned therein and wherein there are a plurality of inlets from said first chamber to said second chamber.

18. An on-board reductant delivery assembly as described in claim 17, wherein said inlets between said first and second chambers of said housing have fins which divert said pressurized air to turbulently pass therethrough.

* * * * *